United States Patent
Lee et al.

(10) Patent No.: US 7,302,695 B2
(45) Date of Patent: Nov. 27, 2007

(54) SLOT-IN TYPE OPTICAL DISK PLAYER

(75) Inventors: Cheong-Hee Lee, Kyunggi-do (KR);
Ju-Chul Kim, Kyunggi-do (KR);
Jae-Joon Yoon, Seoul (KR)

(73) Assignee: Samsung Electro-Mechanics Co., Ltd, Kyunggi-Do (KR)

( * ) Notice: Subject to any disclaimer, the term of this patent is extended or adjusted under 35 U.S.C. 154(b) by 673 days.

(21) Appl. No.: 10/953,339

(22) Filed: Sep. 29, 2004

(65) Prior Publication Data
US 2005/0262524 A1    Nov. 24, 2005

(30) Foreign Application Priority Data
May 19, 2004    (KR)    ...................... 10-2004-0035642

(51) Int. Cl.
G11B 17/04    (2006.01)
G11B 17/03    (2006.01)
G11B 33/02    (2006.01)
G11B 7/24    (2006.01)
G11B 23/03    (2006.01)

(52) U.S. Cl. ...................................... 720/622; 720/616
(58) Field of Classification Search ................ 720/622, 720/616
See application file for complete search history.

(56) References Cited

U.S. PATENT DOCUMENTS 6,125,090 A * 9/2000 Nakamichi .................. 720/622
6,542,453 B1 * 4/2003 Yamada et al. ............. 720/616
6,892,384 B2 * 5/2005 Kim et al. ................... 720/623
6,930,970 B2 * 8/2005 Kuo ........................... 720/620
7,065,773 B2 * 6/2006 Azai ........................... 720/622
7,100,176 B2 * 8/2006 Nishida et al. ............. 720/611
2003/0227856 A1 * 12/2003 Kim et al. .................. 369/77.1

FOREIGN PATENT DOCUMENTS

KR    167068    9/1998
KR    2003-94927    12/2003

* cited by examiner

Primary Examiner—Angel Castro
Assistant Examiner—Christopher R. Magee
(74) Attorney, Agent, or Firm—Gottlieb, Rackman & Reisman, P.C.

(57) ABSTRACT

The present invention provides a slot-in type optical disk player which has a guide unit to guide an optical disk, inserted into an inlet, to a central portion of the inlet of the optical disk player, and a disk guide device to allow the optical disk player to play either of 80 mm and 120 mm optical disks. The disk guide device includes a chucking plate, a guide arm, a select arm, a push arm and a push lever. As such, the optical disk player of the present invention plays either of the 80 mm and 120 mm optical disks, so that the optical disk player is economical and practical. Furthermore, the optical disk player has the guide unit which is provided in a disk loading part.

10 Claims, 10 Drawing Sheets

SLOT-IN TYPE OPTICAL DISK PLAYER

BACKGROUND OF THE INVENTION

1. Field of the Invention

The present invention relates generally to optical disk players, and more particularly, to a slot-in type optical disk player in which, when one of different-sized optical disks, such as 80 mm optical disks and 120 mm optical disks, is loaded in the optical disk player, the optical disk is seated onto a central portion of a turntable by a single mechanism with a low risk of failure, regardless of the diameters of the optical disks.

2. Description of the Related Art

Generally, optical disk players are devices to record information onto optical disks and to reproduce the recorded information from the optical disks using optical systems. According to disk-loading methods, the optical disk players are classified into two types: tray type optical disk players and slot-in type optical disk players.

The tray type optical disk players each use a disk loading method in which a tray to support thereon a disk is ejected from the optical disk player, and thereafter, the tray with the disk seated thereon is retracted into the optical disk player. Typically, the tray type optical disk players are used in electronic products, such as computers, stereos and etc. However, the tray type optical disk players that must have tray driving mechanisms are not suitable for vehicles because of space limitations.

Due to the above-mentioned problems of the tray type optical disk players, the slot-in type optical disk players are widely used for vehicles. The slot-in type optical disk players each have a disk loading method in that an optical disk is inserted into an inlet of an optical disk player and then automatically loaded on a place in the interior of the optical disk player by a rotation of a roller operated by a motor. As such, the slot-in type optical disk players have no trays, thus eliminating spaces required to accept the trays when they are ejected from the optical disk players. Therefore, the slot-in type optical disk players are most suitable for vehicles.

The detailed construction of the slot-in type optical disk players is as follows. The slot-in type optical disk players each include a turntable to seat thereon an optical disk, and a disk loading part to load the optical disk into the interior of the optical disk player, and seat the optical disk on the turntable. The optical disk player further includes a drive unit to rotate the turntable, and a clamping unit to prevent the optical disk from being undesirably removed from the turntable during a rotation of the turntable. The slot-in type optical disk player further includes an optical pickup which is linearly reciprocated in a radial direction of the optical disk to record information onto the optical disk or to reproduce recorded information from the optical disk, and a conveying unit to reciprocate the optical pickup. Furthermore, to classify and load different-sized optical disks, such as 80 mm optical disks and 120 mm optical disks, the slot-in type optical disk player may further include a disk guide device which guides the optical disk onto a central portion of the turntable regardless of the diameter of the optical disk during the optical disk loading process.

For example, a disk player for vehicles, which is used for both 80 mm/120 mm disks, was proposed in Korean Patent Registration NO. 0167068.

The conventional disk player disclosed in NO. 0167068 includes a lever selector which is rotatably provided on a predetermined portion of a deck frame. The lever selector has a guide protrusion to monitor a disk which is loaded into a deck, and a contact protrusion to drive an arm locking guider. The conventional disk player further includes the arm locking guider which is rotatably provided around a hinge on a predetermined portion of the deck frame which is near to an end of the lever selector. A first end of the arm locking guider is in contact with the contact protrusion of the lever selector. A locking part, which locks a stop pin provided on a first guide arm, is provided around a second end of the arm locking guider. In the conventional disk player of NO. 0167068, when the disk is loaded into the deck frame, the lever selector is rotated in a predetermined direction. Then, the second end of the arm locking guider, which is in contact with the contact protrusion of the lever selector, is rotated in a predetermined direction. Thus, the locking part, which is provided around the second end of the arm locking guider, locks or unlocks the stop pin of the first guide arm. The first guide arm and a second guide arm, which are rotated at the same angle, have at first ends thereof first and second gears to correspond to each other, respectively. Each of the first and second guide arms has at a second end thereof a stopper which is moved along each of arc-shaped guides of a clamp while the first and second gears engage with each other. The second guide arm is coupled to the arm locking guider by a tension spring. Thus, the loaded disk comes into contact with the stoppers of the first and second guide arms at different positions according to the diameter of the disk which is 80 mm or 120 mm.

However, the conventional disk player has a complex structure in that the disk is guided by the two guide arms while the two gears of the two guide arms engage with each other, thus reducing the manufacturability due to large numbers of parts, and increasing the failure rate due to the complex operation of the disk player.

Furthermore, when the conventional disk player is used for long periods, impacts caused during the operation thereof are continuously transferred to the gears of the guide arms. Therefore, the gears of the guide arms are worn or damaged, so that the disk player may be not smoothly operated.

In another example, a disk loading device for disk players was proposed in Korean Patent Laid-open Publication NO. 2003-0094927.

The conventional disk loading device disclosed in NO. 2003-0094927 is used in a disk player which loads either a first disk or a second disk, which is smaller than the first disk, into a chucking position. The conventional disk loading device of NO. 2003-0094927 includes a main chassis which has a feeding roller to convey inward one of the first and second disks inserted into the disk player, and a power transmission unit to transmit the power of a drive motor to the feeding roller. The disk loading device further includes a slider which is mounted on the main chassis to be reciprocated in a disk loading direction. The slider is selectively coupled to the power transmission unit to be driven forward and rearward, depending on a moving position of the slider. The disk loading device further includes a first link mechanism which guides the first disk to the chucking position while being pushed and moved by the first disk, and moves the slider to connect the slider to the power transmission unit when the first disk is inserted into the disk player. The disk loading device further includes a second link mechanism which connects the slider to the power transmission unit while being pushed and moved by the second disk when the second disk is moved to the chucking position while being in contact with and guided by the first link mechanism. The disk loading device further includes a sub-chassis which is linked to the slider and reciprocated in the direction crossing to the disk loading direction. Thus, the first link mechanism linked to the sub-chassis separates the first link mechanism from the first disk or the second disk placed on the chucking position. The disk loading device further includes a locking lever which is operated in conjunction with the inserted first disk or the sub-chassis. Thus, the locking lever selectively locks a movement of the first link mechanism or releases the locked state of the first link mechanism.

In the conventional disk loading device, when the first disk of a 120 mm diameter is inserted into the disk player, a first chucking operation is executed by the first link mechanism to chuck the first disk. When the second disk of a 80 mm diameter is inserted into the disk player, a second chucking operation is executed by the second link mechanism to chuck the second disk.

As such, the conventional disk loading device has both first and second link mechanisms which are operated in different ways according to the diameters of the disks. Therefore, the operation of the disk player is very complex, thus increasing the failure rate of the disk players. Furthermore, the structure of the disk player is very complicated, thus reducing the manufacturability and productivity thereof.

SUMMARY OF THE INVENTION

Accordingly, the present invention has been made keeping in mind the above problems occurring in the prior art, and an object of the present invention is to provide a slot-in type optical disk player which has a disk guide device to guide an optical disk onto a turntable regardless of a diameter of the optical disk, and in which the disk guide device has a simple structure to simplify the an operation of the optical disk player, thus reducing the failure rate, and increasing the manufacturability and productivity.

Another object of the present invention is to provide a slot-in type optical disk player which has a disk loading part with a guide unit, so that an optical disk, inserted into an inlet, is guided into a central portion of the inlet without failure.

In an aspect, the present invention provides a slot-in type optical disk player having a disk guide device to guide an optical disk onto a central portion of a turntable regardless of a diameter of the optical disk. The disk guide device includes a chucking plate provided in a main body of the optical disk player, with a first hinge shaft provided on a rear portion of the chucking plate to allow the chucking plate to be rotated upward and downward around the first hinge shaft relative to the main body, and a chuck provided on a front portion of the chucking plate to compress an upper surface of the optical disk seated on the turntable; a guide arm provided on a predetermined portion of a lower surface of the chucking plate to be moved forward and rearward, with a guide protrusion provided on each of both ends of a lower surface of the guide arm to guide the optical disk, inserted into the optical disk player, onto the central portion of the turntable; and a select arm provided on a predetermined portion of an upper surface of the chucking plate, so that the select arm is rotated around a second hinge shaft thereof on the chucking plate at a predetermined angle. The select arm is coupled at a first end thereof to the guide arm, with a protrusion guide hole comprising a first guide hole part and a second guide hole part and provided on a second end of the select arm, and a spring coupled to a predetermined portion of the select arm to rotate the select arm in a predetermined direction, thus moving the guide arm forwardly. The disk guide device further includes a push arm provided on a predetermined portion of the lower surface of the chucking plate while being coupled to the second hinge shaft of the select arm, so that the push arm is rotated around the second hinge shaft of the select arm at a predetermined angle and is linearly and horizontally moved under the guide of the second hinge shaft, with a stop protrusion provided on a predetermined portion of the push arm and inserted into the protrusion guide hole of the select arm while being seated in one of the first and second guide hole parts of the protrusion guide hole, and a spring coupled to a predetermined portion of the push arm to move the push arm in a direction opposite to a pushing direction thereof; and a push lever coupled to a third hinge shaft provided on a predetermined portion of the main body, with a contact pin extending downward from a predetermined portion of the push lever, so that, when a large-diameter optical disk is inserted into the optical disk player, the push lever is rotated around the third hinge shaft of the main body while the contact pin is in contact with the large-diameter optical disk, thus pushing the push arm inwardly, thereby allowing the stop protrusion of the push arm to be removed from the first or second guide hole parts of the select arm, with a spring coupled to a predetermined portion of the push lever to return the push lever to an original position thereof when the contact pin is released.

The optical disk player may further include a slot provided on an intermediate portion of the chucking plate while extending from a front to a rear portion of the chucking plate, and a slider provided on a central portion of an upper surface of the guide arm and inserted in the slot of the chucking plate to slide along the slot, so that the guide arm is moved forward and rearward under the lower surface of the chucking plate.

The optical disk player may further include a coupling protrusion provided on a predetermined portion of the upper surface of the guide arm to be spaced apart from the slider at a predetermined interval, and an elongate coupling hole provided on the first end of the select arm, so that the guide arm is coupled to the select arm by inserting the coupling protrusion of the guide arm into the elongate coupling hole of the select arm.

The optical disk player may further include a hook provided on an end of the second hinge shaft of the select arm, and an elongate slide hole provided on a predetermined portion of the push arm to receive therein the second hinge shaft, so that the push arm is horizontally moved under the guide of the elongate slide hole of the push arm.

In another aspect, the present invention provides a slot-in type optical disk player, having a disk loading part provided around an inlet of a main body of the optical disk player to load an optical disk into the main body, thus seating the optical disk on a turntable. The disk loading part includes a guide unit, with two guide pins respectively provided at left and right sides of the inlet of the main body to be symmetrical based on a central portion of the inlet, so that, when the optical disk is inserted into the inlet, the two guide pins are in contact with the optical disk, and are moved outwardly by a same predetermined distance from the central portion of the inlet, thus guiding the optical disk to the central portion of the inlet of the optical disk player.

The guide unit may include a pinion gear rotatably provided at the central portion above the inlet of the optical disk player; a first guider provided at a predetermined position above the inlet of the optical disk player to be linearly moved in a latitudinal direction, with a first rack gear provided on a predetermined portion of the first guider to engage with the pinion gear, and a first guide pin provided on a predetermined portion of a front part of the first guider while extending downward to be exposed to the inlet of the optical disk player; a second guider provided at a predetermined position opposite to the first guider above the inlet of the optical disk player to be linearly moved in a latitudinal direction, with a second rack gear provided on a predetermined portion of the first guider to engage with the pinion gear, and a second guide pin provided on a predetermined portion of a front part of the second guider while extending downward to be exposed to the inlet of the optical disk player; and a spring coupled between the first and second guiders to elastically bias the first and second guide pins inwardly.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figures 1, 2:
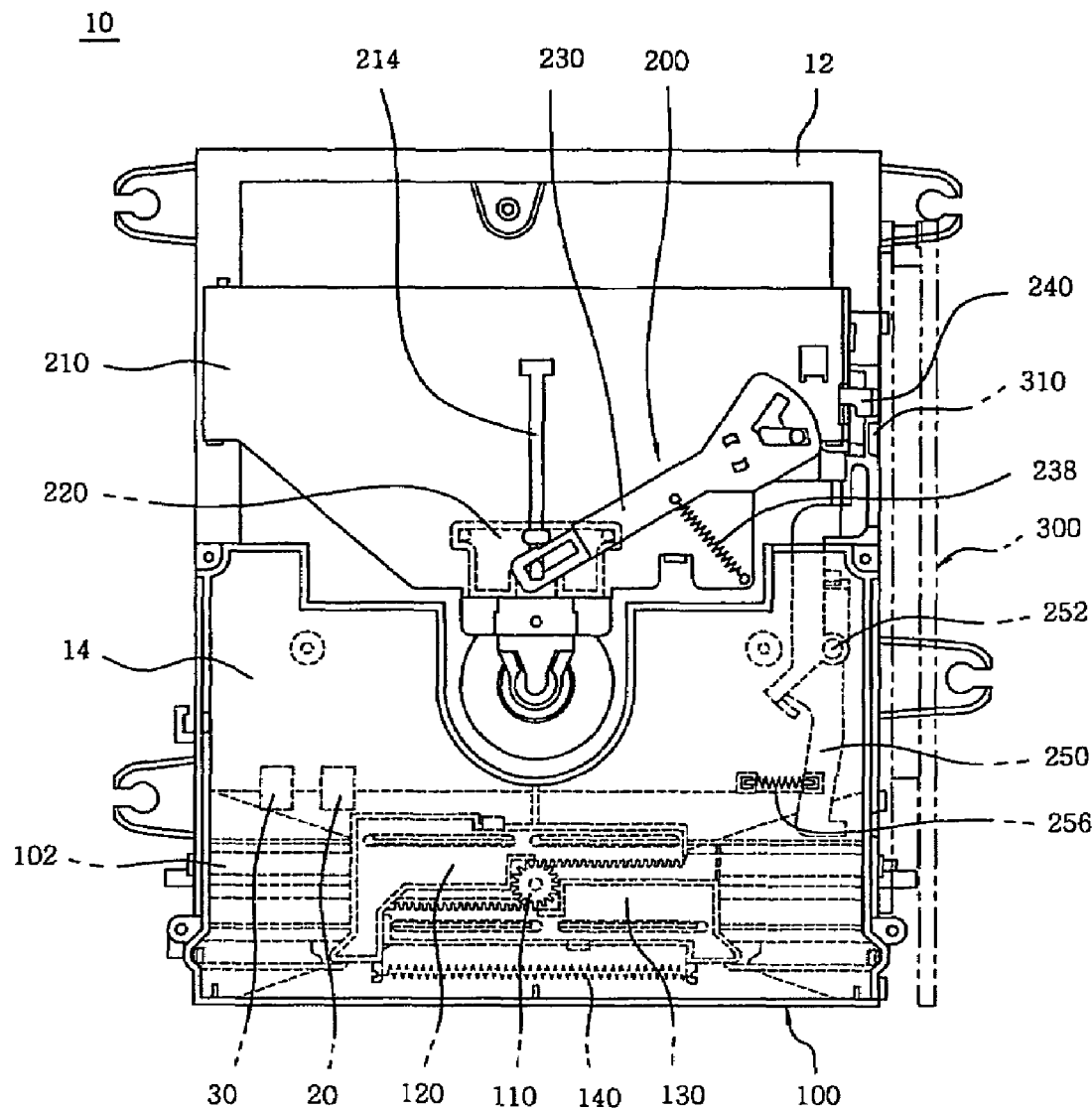
FIG. 1 is a plan view showing a construction of a slot-in type optical disk player, according to an embodiment of the present invention.
FIG. 2 is a front view of the optical disk player of FIG. 1.

Hereinafter, embodiments of the present invention will be described in detail with reference to the attached drawings.

Reference now should be made to the drawings, in which the same reference numerals are used throughout the different drawings to designate the same or similar components.

Figure 3:
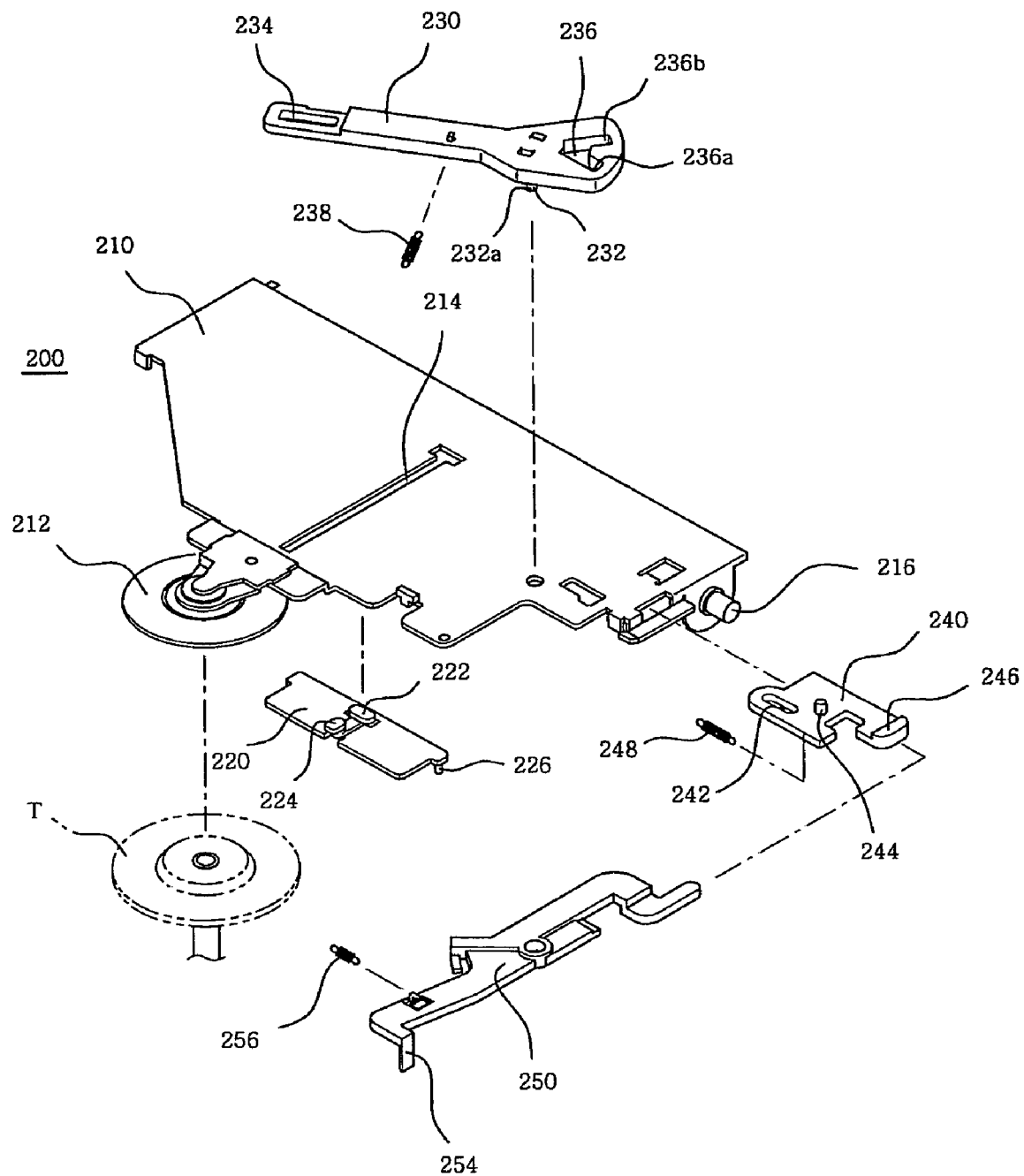
FIG. 3 is an exploded perspective view showing a construction of a disk guide device of the optical disk player of FIG. 1.
Figure 4:
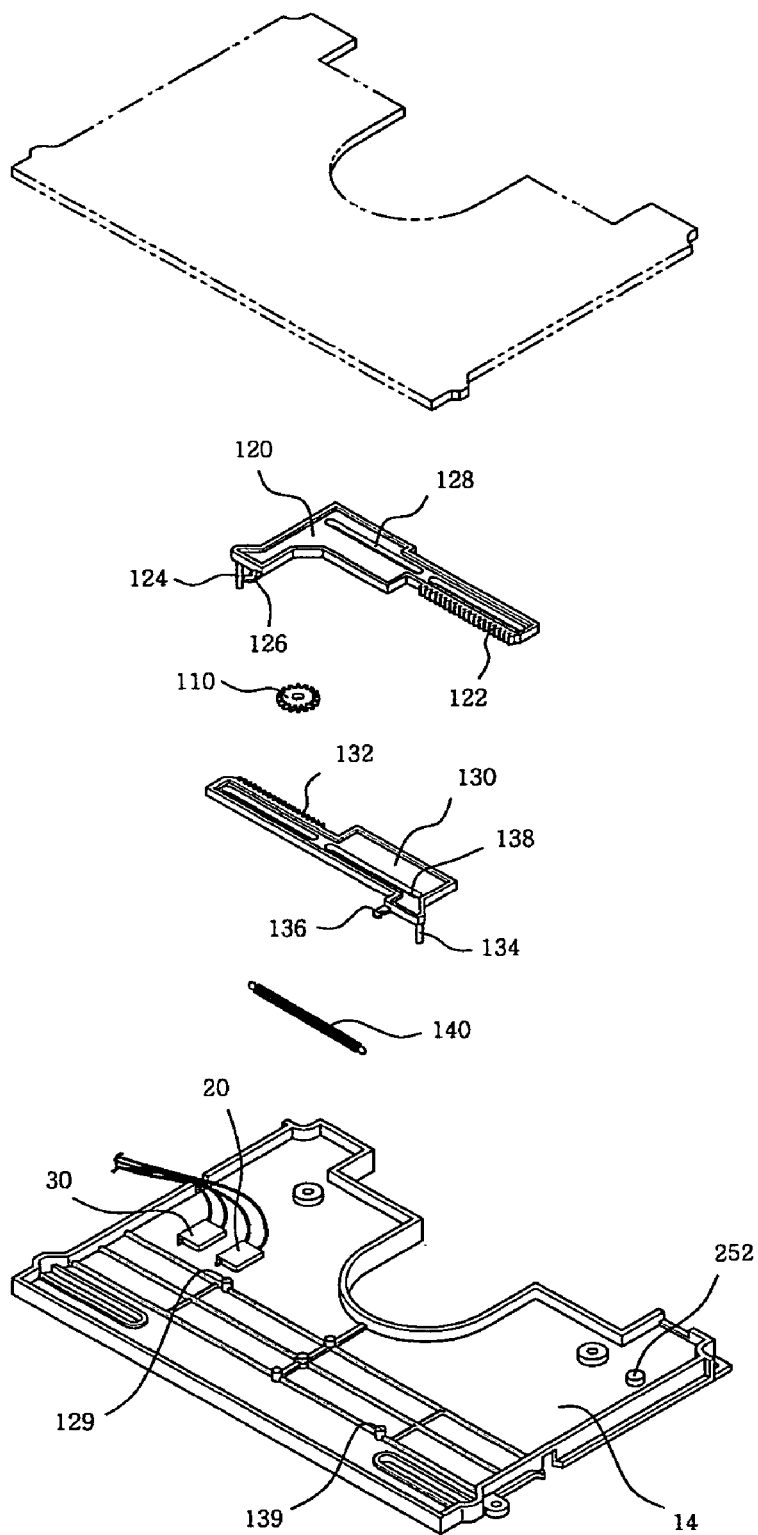
FIG. 4 is an exploded perspective view showing a construction of a guide unit provided in a disk loading part of the optical disk player of FIG. 1.

FIG. 1 is a plan view showing a construction of a slot-in type optical disk player, according to an embodiment of the present invention. FIG. 2 is a front view of the optical disk player of FIG. 1. FIG. 3 is an exploded perspective view showing a construction of a disk guide device of the optical disk player of FIG. 1. FIG. 4 is an exploded perspective view showing a construction of a guide unit provided in a disk loading part of the optical disk player of FIG. 1.

As shown in FIGS. 1 through 4, the optical disk player of the present invention includes a main body 10. The main body 10 comprises a main chassis 12 and a guide chassis 14 which is mounted on an upper surface of the main chassis 12. An inlet 16 is defined on a front of the main body 10 by coupling the guide chassis 14 to the main chassis 12.

The optical disk player further includes a disk loading part 100 which is provided around the inlet 16, provided on the front of the main body 10, to load an optical disk into the main body 10. The optical disk player further includes a disk guide device 200 which is provided in the main body 10 to guide the optical disk, such as an 80 mm optical disk D1 and a 120 mm optical disk D2, onto a central portion of a turntable (T) without failure regardless of a diameter of the optical disk. The optical disk player further includes a chucking unit 300 which is provided at a predetermined portion of the main body 10 to clamp an upper surface of the optical disk, seated on the central portion of the turntable (T), thus preventing the optical disk from being removed from the turntable (T) during a rotation of the turntable (T).

The disk loading part 100 has a roller 102 which forcibly inserts the optical disk into the interior of the main body 10 using a rotational force transmitted thereto from a motor (not shown). The disk loading part 100 further has a guide unit to guide the 80 mm or 120 mm optical disk D1 or D2 into a central portion of the inlet 16 of the optical disk player.

The guide unit is installed in the guide chassis 14. The guide unit includes a pinion gear 110 which is rotatably provided on a central portion of the guide chassis 14. The guide unit further includes a first guider 120 which has at a predetermined portion thereof a first rack gear 122 to engage with the pinion gear 110, so that the first guider 120 is moved in a latitudinal direction under the guide of the first rack gear 122. The guide unit further includes a second guider 130 which is provided at a predetermined position opposite to the first guider 120 and has at a predetermined portion thereof a second rack gear 132 to engage with the pinion gear 110, so that the second guider 130 is moved in another latitudinal direction under the guide of the second rack gear 132. A first spring 140 is coupled between the first and second guiders 120 and 130 to elastically bias the first and second guiders 120 and 130 inwardly.

The first guider 120 has two first elongate guide holes 128 which extend outward from a central portion of the first guide 120 to allow for a linear movement of the first guider 120. Two first guide protrusions 129, which are provided on the guide chassis 14, are respectively inserted into the two first elongate guide holes 128, thus supporting the first guider 120 on the guide chassis 14. The second guider 130 has two second elongate guide holes 138 which extend outward from a central portion of the second guider 130 to allow for a linear movement of the second guider 130. Two second guide protrusions 139, which are provided on the guide chassis 14, are respectively inserted into the two second elongate guide holes 138, thus supporting the second guider 130 on the guide chassis 14.

The first guider 120 further has a first guide pin 124 which is provided on a predetermined portion of a front part of the first guider 120 while extending downward to be exposed to the inlet 16 of the optical disk player after passing through the guide chassis 14. The second guider 130 further has a second guide pin 134 which is provided on a predetermined portion of a front part of the second guider 130 while extending downward to be exposed to the inlet 16 of the optical disk player after passing through the guide chassis 14. At this time, the first and second guide pins 124 and 134 are respectively provided at the left and right sides of the inlet 16 of the main body 10 to be symmetrical based on the central portion of the inlet 16. Thus, when the optical disk is inserted into the inlet 16, the first and second guide pins 124 and 134 are in contact with the optical disk, and are moved outwardly by a same predetermined distance from the central portion of the inlet 16. Thus, the optical disk is guided into the central portion of the inlet 16 of the optical disk player.

The first spring 140 is supported at a first end thereof on a first support piece 126 which is protruded forward from a predetermined portion of the first guider 120. A second end of the first spring 140 is supported on a second support piece 136 which is protruded forward from a predetermined portion of the second guider 130. The first spring 140 elastically biases the first and second guide pins 124 and 134 inwardly.

The disk loading part 100 of the optical disk player further has first and second sensors 20 and 30 which sense a position of the first guider 120 when the first guider 120 is moved outward from the central portion of the inlet 16, thus classifying the size of the optical disk inserted into the inlet 16, and, simultaneously, transmit signals to the motor (not shown) to rotate the roller 102. That is, if only the first sensor 20 senses the movement of the first guider 120, it means that the 80 mm optical disk D1 has been inserted into the optical disk player. In the meantime, when the second sensor 30 as well as the first sensor 20 senses the movement of the first guider 120, it means that the 120 mm optical disk D2 has been inserted into the optical disk player.

When the optical disk has been completely loaded by the disk loading part 100 having the above-mentioned construction, the disk guide device 200 guides the optical disk to seat the optical disk onto the central portion of the turntable (T).

The disk guide device 200 includes a chucking plate 210 which is provided in a rear portion of the main body 10 of the optical disk player, with a first hinge shaft 216 provided on a rear portion of the chucking plate 210 to allow the chucking plate 210 to be rotated upward and downward around the first hinge shaft 216 relative to the main body 10. A chuck 212 is provided on a front portion of the chucking plate 210 to compress the upper surface of the optical disk seated on the turntable (T). The disk guide device 200 further includes a guide arm 220 which is provided on a predetermined portion of a lower surface of the chucking plate 210 to be moved forward and rearward. The disk guide device 200 further includes a selective disk receiving unit which selectively moves rearward the guide arm 220 to allow the disk guide device 200 to reliably receive the 120 mm optical disk D2 when the 120 mm optical disk D2 is inserted into the optical disk player.

To couple the guide arm 220 to the chucking plate 210, the chucking plate 210 has a slot 214 which is provided on an intermediate portion of the chucking plate 210 while extending from a front to a rear portion. Furthermore, the guide arm 220 has a slider 222 which is integrally provided on a central portion of an upper surface of the guide arm 220 and is inserted in the slot 214 of the chucking plate 210 to slide along the slot 214. Thus, the guide arm 220 is moved forward and rearward under the lower surface of the chucking plate 210. Of course, the slider 222 has a predetermined width which is wider than the slot 214 to prevent the slider 222 from being undesirably separated from the slot 214. The slot 214 has at an end thereof an insert hole which has a predetermined width wider than the slider 222, so that the slider 222 is easily inserted into the slot 214 when the guide arm 220 is coupled to the chucking plate 210.

The guide arm 220 further has a coupling protrusion 224 which is integrally provided on a predetermined portion of the upper surface of the guide arm 220 to be spaced apart from the slider 222 at a predetermined interval. By the coupling protrusion 224, the guide arm 220 is coupled to a select arm 230 which will be described later herein. The guide arm 220 further has a guide protrusion 226 which is provided on each of both ends of a lower surface of the guide arm 220 to guide the optical disk, inserted into the optical disk player, onto the central portion of the turntable. At this time, the two guide protrusions 226 are respectively provided at the left and right sides of the guide arm 220 to be symmetrical based on the central portion of the turntable (T).

In the meantime, the select disk receiving unit has the select arm 230 and a push lever 250.

The select arm 230 is provided on a predetermined portion of an upper surface of the chucking plate 210, with a second hinge shaft 232 provided on a predetermined portion of a lower surface of the select arm 230, so that the select arm 230 is rotated around the second hinge shaft 232 on the chucking plate 210 at a predetermined angle. The select arm 230 has an elongate coupling hole 234 which is longitudinally provided on a first end of the select arm 230, so that the guide arm 220 is coupled to the select arm 230 by inserting the coupling protrusion 224 of the guide arm 220 into the elongate coupling hole 234 of the select arm 230. The select arm 230 further has at a second end thereof a protrusion guide hole 236. The select arm 230 further has a hook 232a which is provided on an end of the second hinge shaft 232 to be coupled to a push arm 240 which will be described later herein. The protrusion guide hole 236 of the select arm 230 defines a V-shaped appearance. The protrusion guide hole 236 comprises a first guide hole part 236a and a second guide hole part 236b which diverge while communicating with each other to form the V-shaped guide hole 236. A second spring 238 is coupled at a first end thereof to a predetermined portion of the select arm 230. The second spring 238 is coupled at a second end thereof to a predetermined portion of the chucking plate 210. Therefore, the select arm 230 is elastically rotated in a predetermined direction, thus moving the guide arm 220 forwardly.

The push arm 240 is provided on a predetermined portion of the lower surface of the chucking plate 210 while being coupled to the second hinge shaft 232 of the select arm 230. The push arm 240 is rotated around the second hinge shaft 232 of the select arm 230 at a predetermined angle and is linearly and horizontally moved under the guide of the second hinge shaft 232. To achieve the above-mentioned purpose, the push arm 240 has an elongate slide hole 242 which is provided on a predetermined portion of the push arm 240 to receive therein the second hinge shaft 232. Thus, the push arm 240 is horizontally moved under the guide of the elongate slide hole 242 of the push arm 240. At this time, the hook 232a, provided on the end of the second hinge shaft 232, is hooked into the elongate slide hole 242, so that the push arm 240 is moved under the lower surface of the chucking plate 210. The push arm 240 further has a stop protrusion 244 which is provided on a predetermined portion of the push arm 240. The stop protrusion 244 is inserted into the protrusion guide hole 236 of the select arm 230 while being selectively seated in one of the first and second guide hole parts 236a and 236b of the protrusion guide hole 236. The push arm 240 further has a pusher 246 which is integrally provided on an end of the push arm 240, which is opposite to the elongate slide hole 242. Thus, when the push arm 240 is rotated around the second hinge shaft 232 of the select arm 230, the pusher 246 pushes a predetermined portion of the chucking unit 300, which is a sensor lever 310 shown by the imaginary line in FIG. 1, thus operating the chucking unit 300. A third spring 248 is coupled at a first end thereof to a predetermined portion of the push arm 240. The third spring 248 is coupled at a second end thereof to a predetermined portion of the chucking plate 210. Therefore, by the third spring 248, the push arm 240 is elastically biased in a direction opposite to a pushing direction thereof.

The push lever 250 is provided on the guide chassis 14 to be rotated to a third hinge shaft 252 which is provided on a predetermined portion of the guide chassis 14. The push lever 250 has a contact pin 254 which extends downward from a lower surface of a first end of the push lever 250. The push lever 250 is close at a second end thereof to the push arm 240. At this time, the contact pin 254 is provided such that, when the 80 mm optical disk D1 is inserted into the optical disk player, the contact pin 254 is not in contact with the 80 mm optical disk D1, but, when the 120 mm optical disk D2 is inserted into the optical disk player, the contact pin 254 is in contact with the 120 mm optical disk D2 so that the contact pin 254 is moved outward. That is, during a process of loading the 120 mm optical disk D2, the contact pin 254 is moved outward by the 120 mm optical disk D2. Then, the push lever 250 is rotated around the third hinge shaft 252 of the guide chassis 14. By the rotation of the push lever 250, the second end of the push lever 250 pushes the push arm 240, so that the stop protrusion 244 of the push arm 240 is removed from the first guide hole part 236a of the select arm 230. A fourth spring 256 is coupled at a first end thereof to a predetermined portion of the push lever 250. The fourth spring 256 is coupled at a second end thereof to a predetermined portion of the guide chassis 14. Therefore, the push lever 250 is returned to an original position thereof by the fourth spring 256 when the contact pin 254 is released.

In the meantime, the construction and operation of the chucking unit 300 is a well-known technique in the related art, and further explanation is thus not deemed necessary.

The operation and effect of the slot-in type optical disk player of the present invention having the above-mentioned construction will be described herein below.

First, the operation of the optical disk player to load, seat and chuck the 80 mm optical disk D1 on the turntable (T) will be described as follows with reference to FIGS. 5a through 5c.

Figure 5A:
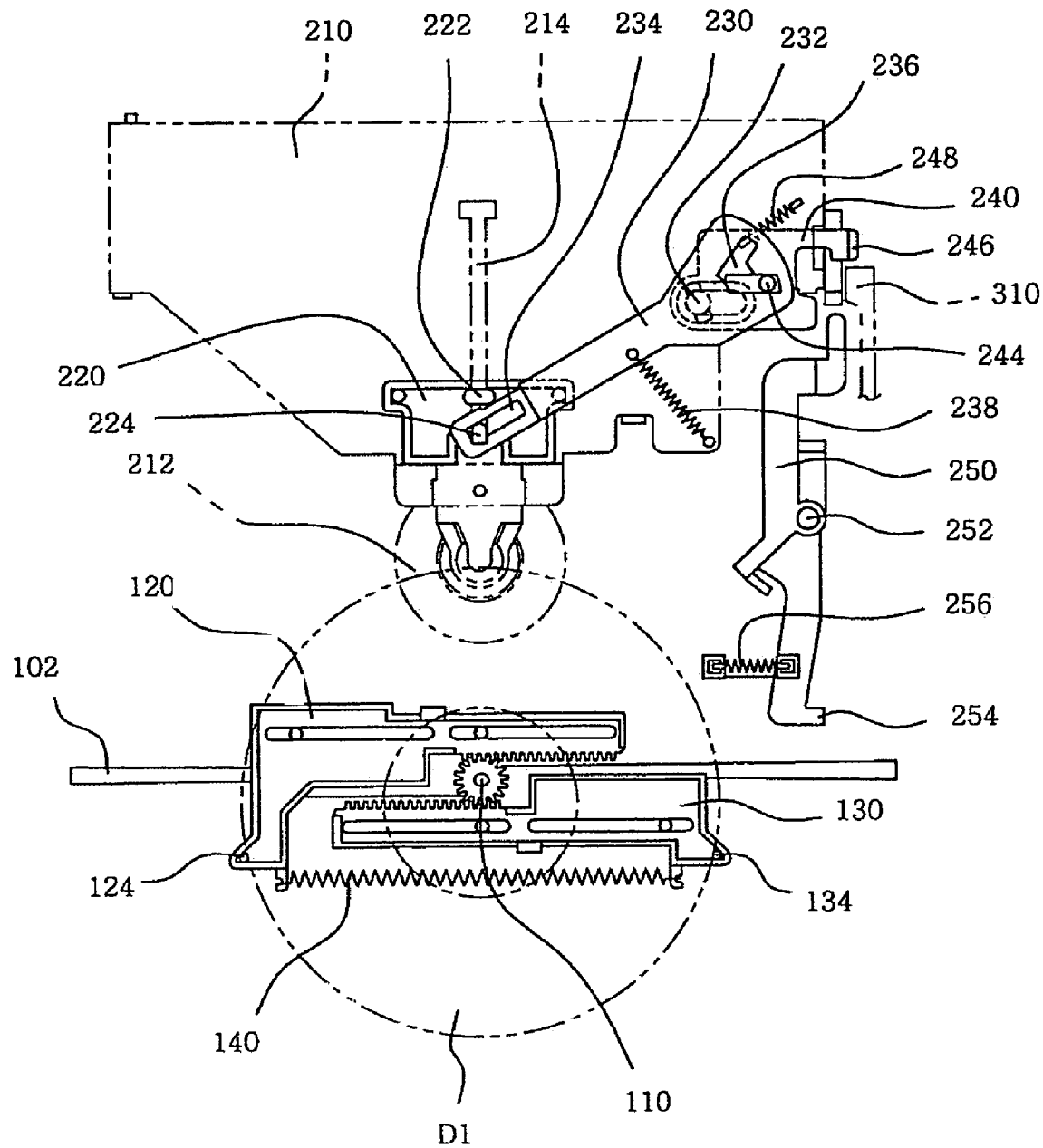
FIGS. 5a through 5c are plan views showing the operations of the guide unit of the disk loading part and the disk guide device of the optical disk player of FIG. 1 when an 80 mm optical disk is inserted into the optical disk player.

As shown in FIG. 5a, when the 80 mm optical disk D1 is inserted into the inlet 16 of the optical disk player, the 80 mm optical disk D1 is guided to the central portion of the inlet 16 by being in contact with both the first and second guide pins 124 and 134 of the first and second guiders 120 and 130. At this time, the first guider 120 along with the first guide pin 124 is moved outward, so that the first sensor 20 senses the movement of the first guider 120 and transmits a signal to the motor (not shown). As a result, the roller 102 is rotated by the operation of the motor, so that the 80 mm optical disk D1, inserted through the inlet 16, is forcibly transferred into the interior of the main body 10.

Figure 5B:
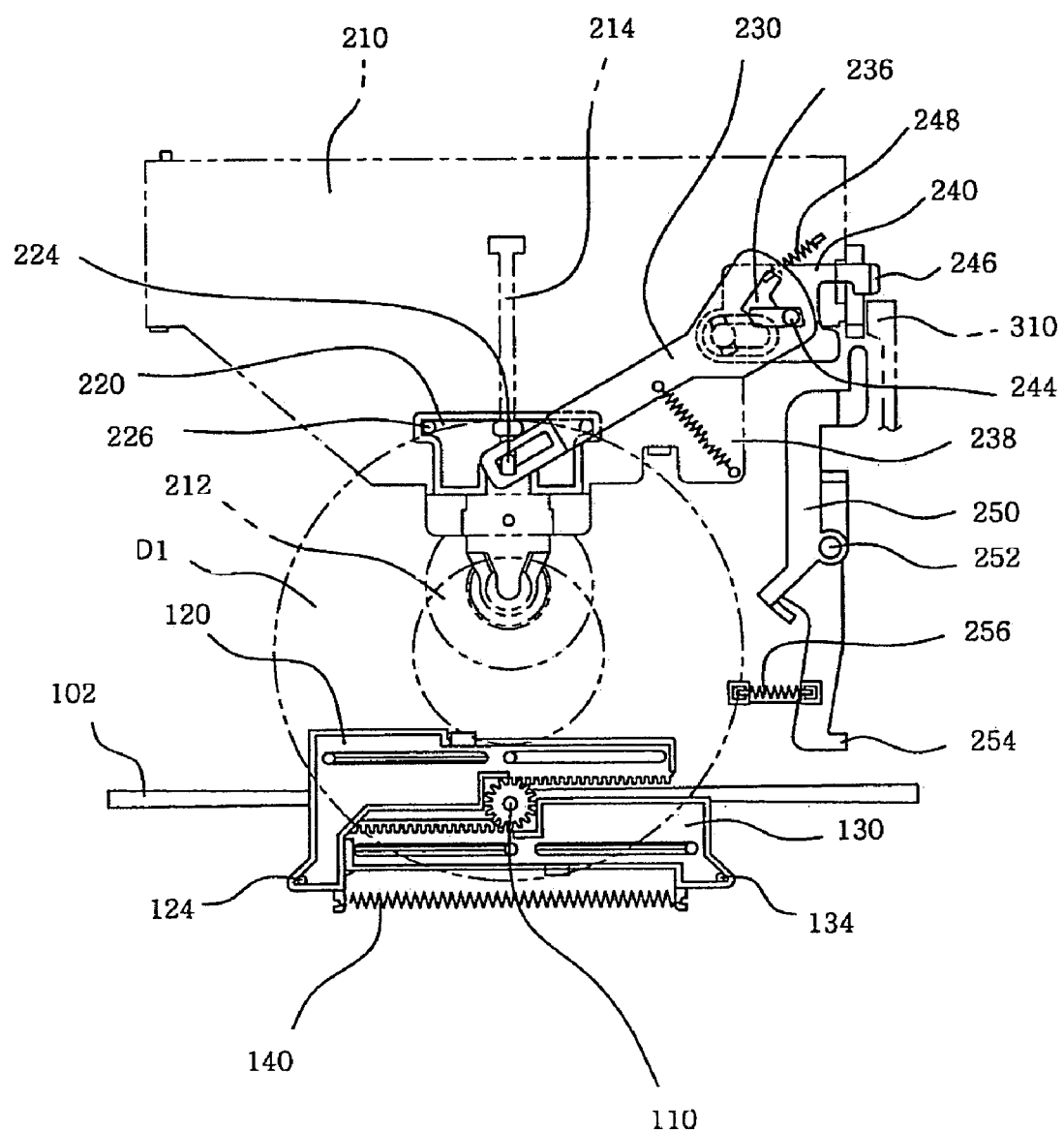

Thereafter, as shown in FIG. 5b, the 80 mm optical disk D1, which is a small-diameter optical disk, is moved toward the rear portion of the main body 10 until coming into contact with the two guide protrusions 226 of the guide arm 220 without being interrupted with the contact pin 254 of the push lever 250. The 80 mm optical disk D1 is, thereafter, guided toward the central portion of the turntable (T) by the two guide protrusions 226 of the guide arm 220. Thus, the 80 mm optical disk D1 is precisely aligned with a center of the turntable (T).

Figure 5C:
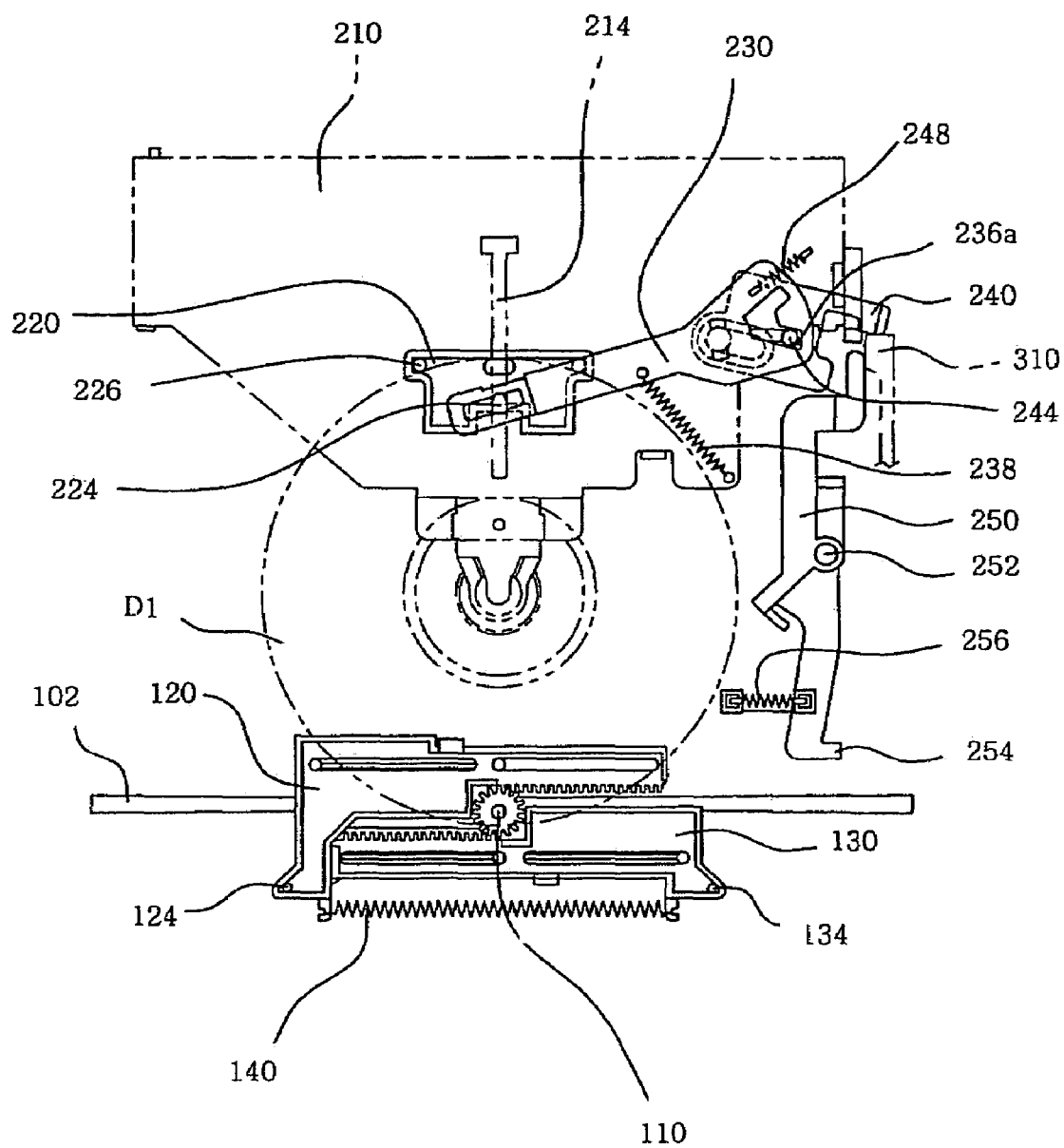

In the above state, the 80 mm optical disk D1 is further moved toward the rear portion of the main body 10, so that the guide arm 220 is slightly moved rearward, as shown in FIG. 5c. Then, the select arm 230, coupled to the guide arm 220, is rotated clockwise around the second hinge shaft 232 of the select arm 230 at a predetermined angle to push forward the stop protrusion 244 of the push arm 240 which is seated in the first guide hole part 236a of the select arm 230. Thus, the push arm 240 is rotated clockwise around the second hinge shaft 232, so that the pusher 246 of the push arm 240 pushes forward the sensor lever 310 of the chucking unit 300 to operate the chucking unit 300. By the operation of the chucking unit 300, the chucking plate 210 is rotated downward around the first hinge shaft 216 of the chucking plate 210. Thus, the chuck 212 of the chucking plate 210 compresses the upper surface of the 80 mm optical disk D1, seated on the upper surface of the turntable (T). Thereafter, the turntable (T) is rotated along with the 80 mm optical disk D1 while the chuck 212 compresses the upper surface of the 80 mm optical disk D1.

Next, the operation of the optical disk player to load, seat and chuck the 120 mm optical disk D2 on the turntable (T) will be described as follows with reference to FIGS. 6a through 6d.

Figure 6A:
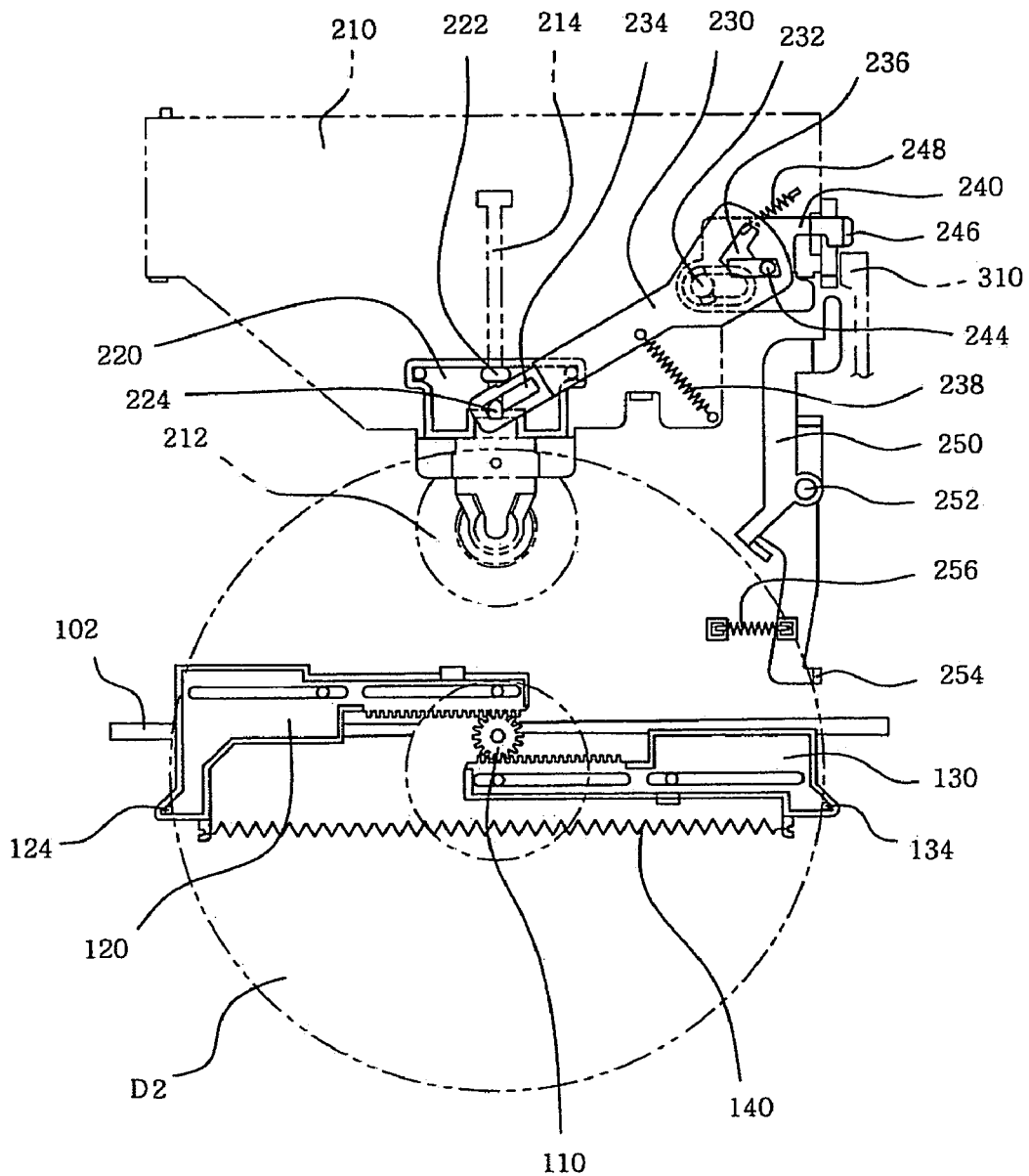
FIGS. 6a through 6d are plan views showing the operations of the guide unit of the disk loading part and the disk guide device of the optical disk player of FIG. 1 when a 120 mm optical disk is inserted into the optical disk player.

As shown in FIG. 6a, when the 120 mm optical disk D2 is inserted into the inlet 16 of the optical disk player, the 120 mm optical disk D2 is guided to the central portion of the inlet 16 by being in contact with both the first and second guide pins 124 and 134 of the first and second guiders 120 and 130. At this time, the first guider 120 along with the first guide pin 124 is moved outward, so that the second sensor 30 monitors the movement of the first guider 120 and transmits a signal to the motor (not shown). As a result, the roller 102 is rotated by the operation of the motor, so that the 120 mm optical disk D2, inserted through the inlet 16, is forcibly transferred into the interior of the main body 10.

Figure 6B:
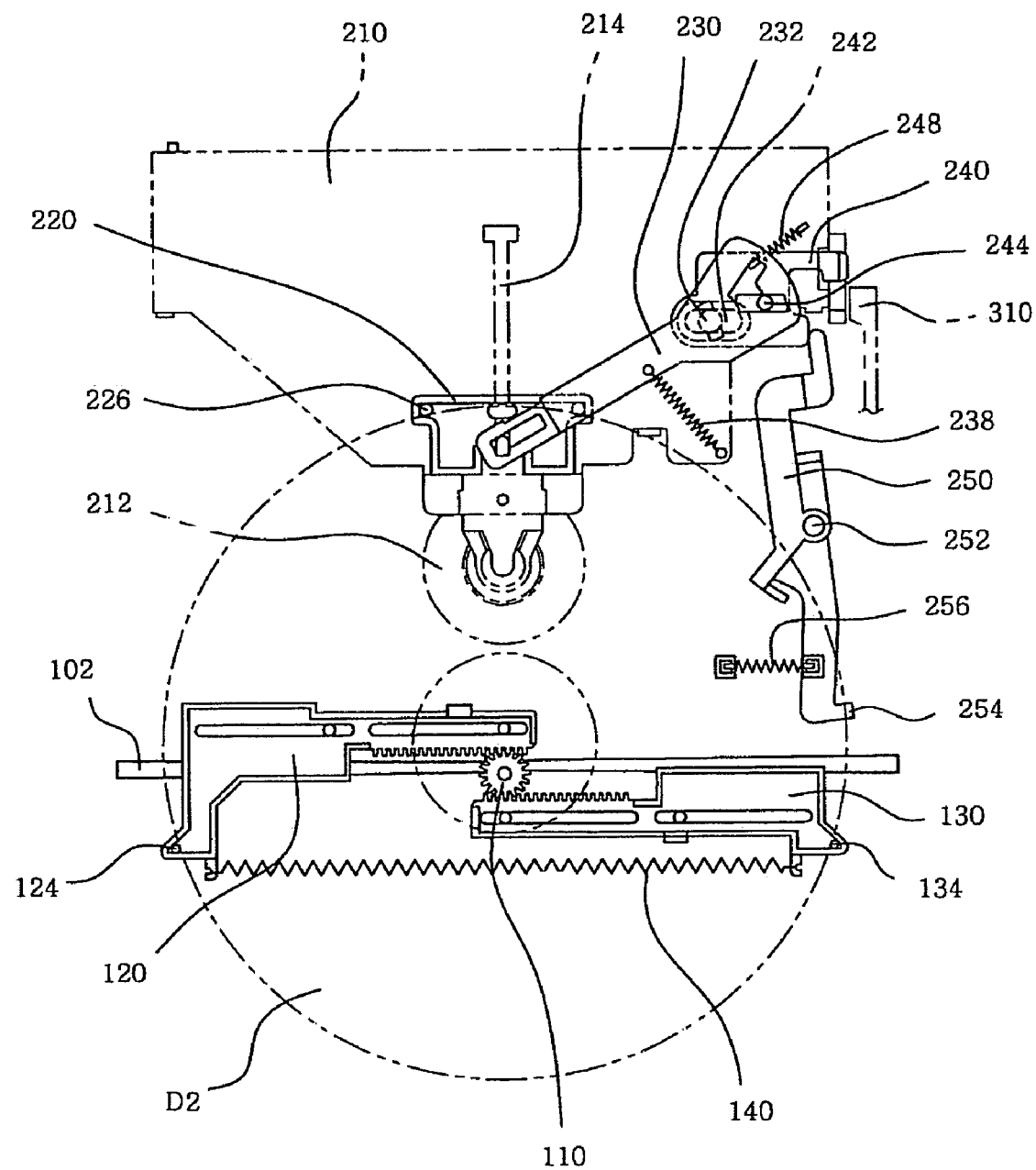

After the 120 mm optical disk D2 is inserted through the inlet 16, the 120 mm optical disk D2 pushes the contact pin 254 of the push lever 250 outwardly, as shown in FIG. 6b. Therefore, the push lever 250 is rotated counterclockwise around the third hinge shaft 252 of the guide chassis 14. By the rotation of the push lever 250, the push arm 240 is moved inward. At this time, because the push arm 240 has the elongate slide hole 242 to receive therein the second hinge shaft 232 of the select arm 230, the push arm 240 can move inward under the guide of the second hinge shaft 232. While the push arm 240 is moved inward, the stop protrusion 244 of the push arm 240 is removed from the first guide hole part 236a of the select arm 230. While the above-mentioned process is executed, the 120 mm optical disk D2 is moved toward the rear portion of the main body 10 until being in contact with the two guide protrusions 226 of the guide arm 220. Thereafter, the 120 mm optical disk D2 is guided toward the central portion of the turntable (T) under the guide of the two guide protrusions 226. Thus, the 120 mm optical disk D2 is precisely aligned with the center of the turntable (T).

Figure 6C:
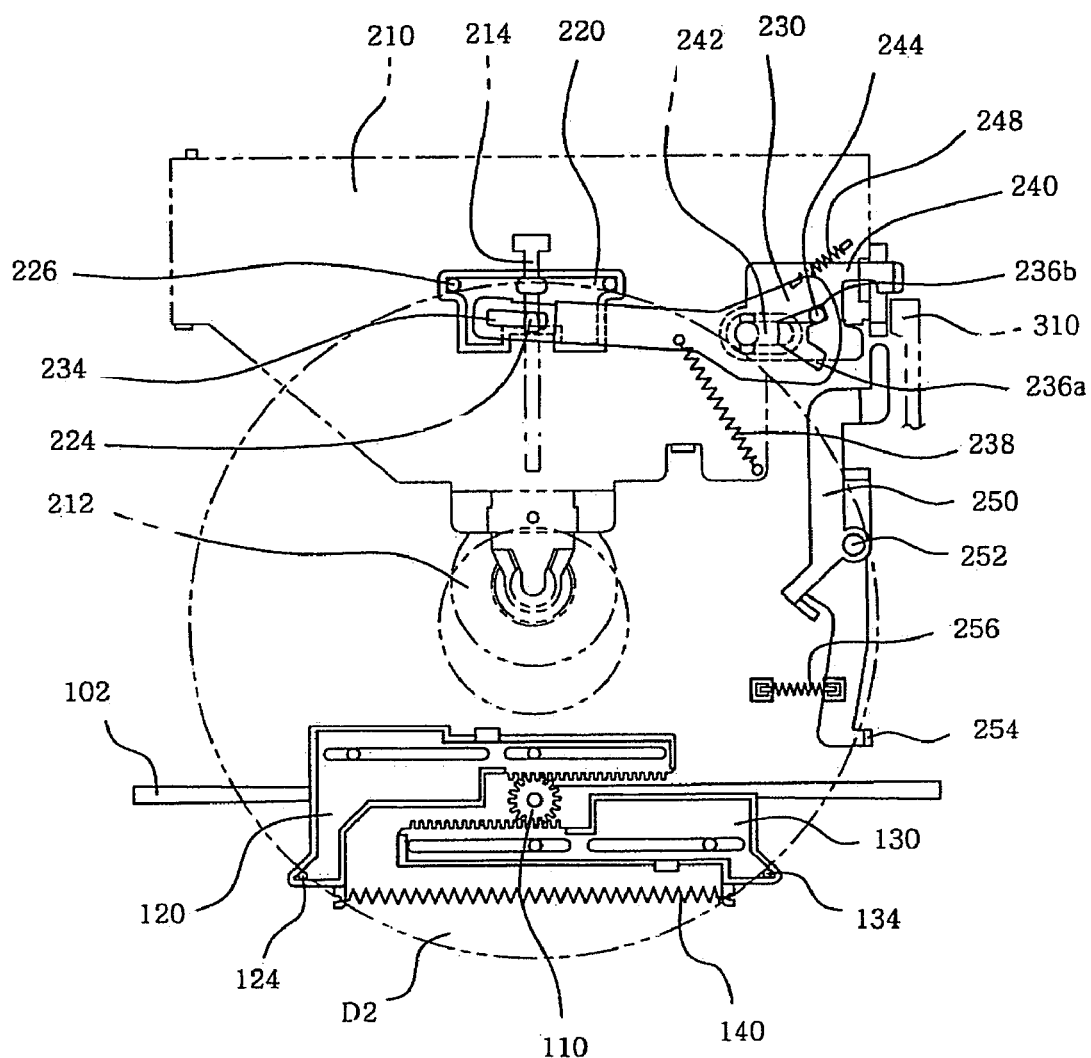

In the above state, the 120 mm optical disk D2 is further moved toward the rear portion of the main body 10, so that the guide arm 220 is pushed rearward by the 120 mm optical disk D2, as shown in FIG. 6c. While the guide arm 220 is moved rearward along the slot 214 of the chucking plate 210, the selected arm 230, coupled to the guide arm 220, is rotated clockwise around the second hinge shaft 232 of the select arm 230 at a predetermined angle. At this time, the stop protrusion 244 of the push arm 240, removed from the first guide hole part 236a, is placed at an end of the second guide hole part 236b after being guided along the protrusion guide hole 236 of the select arm 230. The contact pin 254 of the push lever 250 is released after the 120 mm optical disk D2 has been moved to the rear portion of the main body 10, so that the push lever 250 is returned to the original position thereof. Simultaneously, the push arm 240 is released from the push lever 250. Therefore, the push arm 240 is also returned to the original position thereof by a restoring force of the third spring 248 coupled to the push arm 240. Thus, the stop protrusion 244 of the push arm 240 is inserted into the second guide hole part 236b.

Figure 6D:
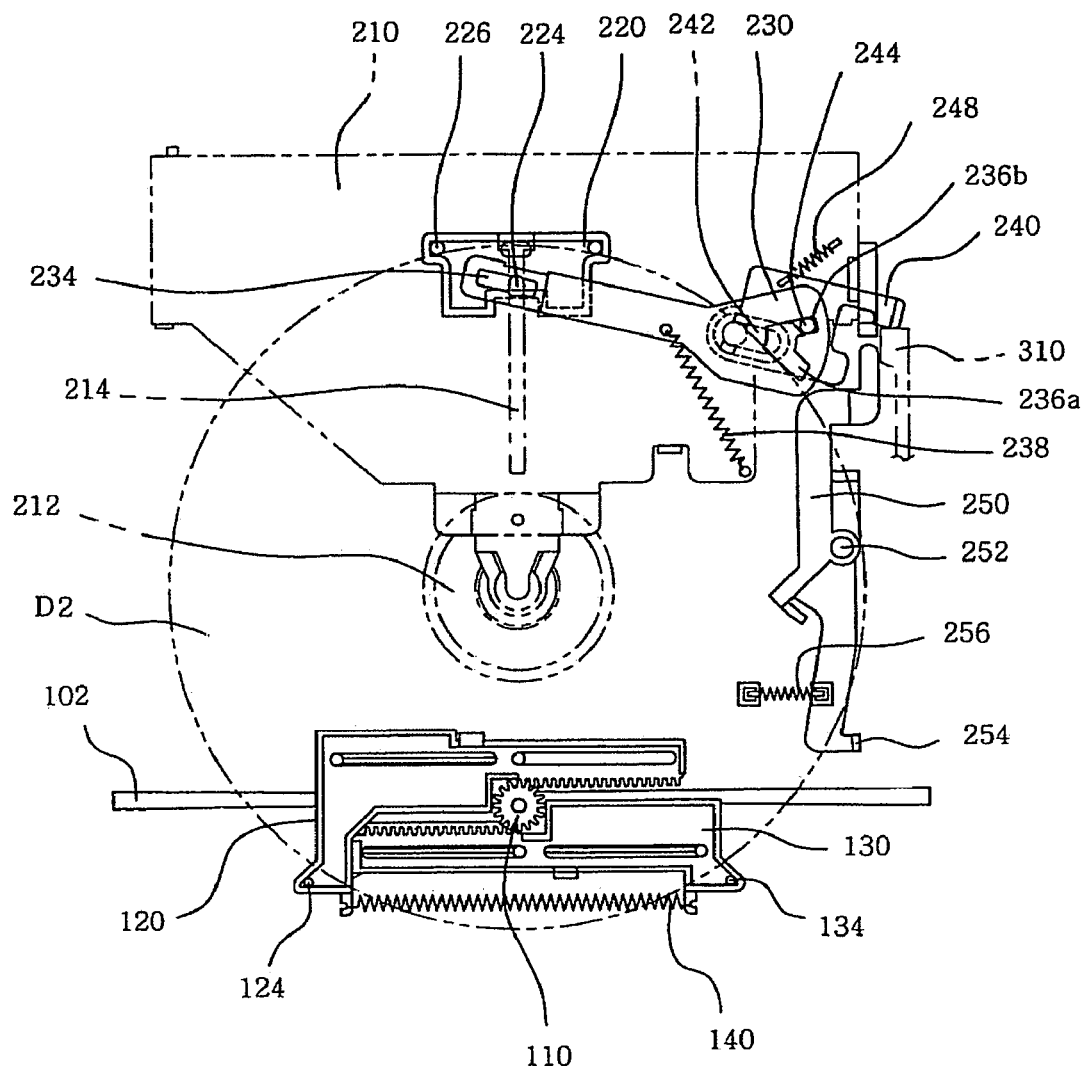

In the above state, as shown in FIG. 6d, the 120 mm optical disk D2 is further moved toward the rear portion of the main body 10. Then, the select arm 230 is further rotated clockwise to push forward the stop protrusion 244 of the push arm 240 which is placed in the second guide hole part 236b. Thus, the push arm 240 is rotated clockwise around the second hinge shaft 232, so that the pusher 246 of the push arm 240 pushes forward the sensor lever 310 of the chucking unit 300 to operate the chucking unit 300. By the operation of the chucking unit 300, the chucking plate 210 is rotated downward around the first hinge shaft 216 of the chucking plate 210. Thus, the chuck 212 of the chucking plate 210 compresses the upper surface of the 120 mm optical disk D2, seated on the upper surface of the turntable (T). Thereafter, the turntable (T) is rotated along with the 120 mm optical disk D2 while the chuck 212 compresses the upper surface of the 120 mm optical disk D2.

As such, the slot-in type optical disk player of the present invention is driven for both the 80 mm optical disk and the 120 mm optical disk regardless of the diameter of the optical disk, thus recording information onto the optical disk, or reproducing the recorded information from the optical disk.

Furthermore, the optical disk player of the present invention has the guide unit which is provided in the disk loading part. Therefore, the optical disk, inserted into the inlet, is precisely guided to the central portion of the inlet by the guide of the guide unit.

In addition, in the optical disk player, the disk guide device has the simple structure in comparison with conventional disk guide devices, thus reducing the production costs due to a reduction in a number of parts, and simplifying the operation of the disk player. Furthermore, the optical disk player with the simple structure increases the manufacturability and productivity thereof, and reduces failure rate.

As described above, the present invention provides a slot-in type optical disk player that has a structure enabling driving of an optical disk, such as an 80 mm optical disk or a 120 mm optical disk, regardless of the diameter of the optical disk. Therefore, a user is not forced to purchase separate optical disk players for different-sized optical disks. Accordingly, the optical disk player of the present invention is economical and practical.

Furthermore, the optical disk player of the present invention has a guide unit which is provided in a disk loading part. Therefore, the optical disk, inserted into an inlet, is precisely guided to a central portion of the inlet.

In addition, the optical disk player of the present invention has a disk guide device with a simple structure, thus reducing the production costs, being simply operated, and reducing failure rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A slot-in type optical disk player comprising a disk guide device to guide an optical disk onto a central portion of a turntable regardless of a diameter of the optical disk, the disk guide device comprising:
   a chucking plate provided in a main body of the optical disk player, with a first hinge shaft provided on a rear portion of the chucking plate to allow the chucking plate to be rotated upward and downward around the first hinge shaft relative to the main body, and a chuck provided on a front portion of the chucking plate to compress an upper surface of the optical disk seated on the turntable;
   a guide arm provided on a predetermined portion of a lower surface of the chucking plate to be moved forward and rearward, with a guide protrusion provided on each of both ends of a lower surface of the guide arm to guide the optical disk, inserted into the optical disk player, onto the central portion of the turntable;
   a select arm provided on a predetermined portion of an upper surface of the chucking plate, so that the select arm is rotated around a second hinge shaft thereof on the chucking plate at a predetermined angle, the select arm being coupled at a first end thereof to the guide arm, with a protrusion guide hole comprising a first guide hole part and a second guide hole part and provided on a second end of the select arm, and a spring coupled to a predetermined portion of the select arm to rotate the select arm in a predetermined direction, thus moving the guide arm forwardly;
   a push arm provided on a predetermined portion of the lower surface of the chucking plate while being coupled to the second hinge shaft of the select arm, so that the push arm is rotated around the second hinge shaft of the select arm at a predetermined angle and is linearly and horizontally moved under the guide of the second hinge shaft, with a stop protrusion provided on a predetermined portion of the push arm and inserted into the protrusion guide hole of the select arm while being seated in one of the first and second guide hole parts of the protrusion guide hole, and a spring coupled to a predetermined portion of the push arm to move the push arm in a direction opposite to a pushing direction thereof; and
   a push lever coupled to a third hinge shaft provided on a predetermined portion of the main body, with a contact pin extending downward from a predetermined portion of the push lever, so that, when a large-diameter optical disk is inserted into the optical disk player, the push lever is rotated around the third hinge shaft of the main body while the contact pin is in contact with the large-diameter optical disk, thus pushing the push arm inwardly, thereby allowing the stop protrusion of the push arm to be removed from the first or second guide hole parts of the select arm, with a spring coupled to a predetermined portion of the push lever to return the push lever to an original position thereof when the contact pin is released.

2. The optical disk player according to claim 1, further comprising:
   a slot provided on an intermediate portion of the chucking plate while extending from a front to a rear portion of the chucking plate; and
   a slider provided on a central portion of an upper surface of the guide arm and inserted in the slot of the chucking plate to slide along the slot, so that the guide arm is moved forward and rearward under the lower surface of the chucking plate.

3. The optical disk player according to claim 2, further comprising:
   a coupling protrusion provided on a predetermined portion of the upper surface of the guide arm to be spaced apart from the slider at a predetermined interval; and
   an elongate coupling hole provided on the first end of the select arm, so that the guide arm is coupled to the select arm by inserting the coupling protrusion of the guide arm into the elongate coupling hole of the select arm.

4. The optical disk player according to claim 1, further comprising:

a hook provided on an end of the second hinge shaft of the select arm; and an elongate slide hole provided on a predetermined portion of the push arm to receive therein the second hinge shaft, so that the push arm is horizontally moved under the guide of the elongate slide hole of the push arm.

5. A slot-in type optical disk player, comprising a disk loading part provided around an inlet of a main body of the optical disk player to load an optical disk into the main body, thus seating the optical disk on a turntable, the disk loading part comprising:

a guide unit, with two guide pins respectively provided at left and right sides of the inlet of the main body to be symmetrical based on a central portion of the inlet, so that, when the optical disk is inserted into the inlet, the two guide pins are in contact with the optical disk, and are moved outwardly by a same predetermined distance from the central portion of the inlet, thus guiding the optical disk to the central portion of the inlet of the optical disk player.

6. The optical disk player according to claim 5, wherein the guide unit comprises:

a pinion gear rotatably provided at the central portion above the inlet of the optical disk player;

a first guider provided at a predetermined position above the inlet of the optical disk player to be linearly moved in a latitudinal direction, with a first rack gear provided on a predetermined portion of the first guider to engage with the pinion gear, and a first guide pin provided on a predetermined portion of a front part of the first guider while extending downward to be exposed to the inlet of the optical disk player;

a second guider provided at a predetermined position opposite to the first guider above the inlet of the optical disk player to be linearly moved in a latitudinal direction, with a second rack gear provided on a predetermined portion of the first guider to engage with the pinion gear, and a second guide pin provided on a predetermined portion of a front part of the second guider while extending downward to be exposed to the inlet of the optical disk player; and a spring coupled between the first and second guiders to elastically bias the first and second guide pins inwardly.

7. A slot-in type optical disk player, comprising: a disk loading part provided around an inlet of a main body of the optical disk player to load an optical disk inserted through the inlet into the main body; a disk guide device to guide the optical disk onto a central portion of a turntable regardless of a diameter of the optical disk; and a chucking unit provided at a predetermined portion of the main body of the optical disk player to hold the optical disk, seated on the central portion of the turntable, thus preventing the optical disk from being removed from the turntable during a rotation of the turntable, wherein the disk guide device comprises:

a chucking plate provided in the main body of the optical disk player, with a first hinge shaft provided on a rear portion of the chucking plate to allow the chucking plate to be rotated upward and downward around the first hinge shaft relative to the main body, and a chuck provided on a front portion of the chucking plate to compress an upper surface of the optical disk seated on the turntable;

a guide arm provided on a predetermined portion of a lower surface of the chucking plate to be moved forward and rearward, with a guide protrusion provided on each of both ends of a lower surface of the guide arm to guide the optical disk, inserted into the optical disk player, onto the central portion of the turntable;

a select arm provided on a predetermined portion of an upper surface of the chucking plate, so that the select arm is rotated around a second hinge shaft thereof on the chucking plate at a predetermined angle, the select arm being coupled at a first end thereof to the guide arm, with a protrusion guide hole comprising a first guide hole part and a second guide hole part and provided on a second end of the select arm, and a spring coupled to a predetermined portion of the select arm to rotate the select arm in a predetermined direction, thus moving the guide arm forwardly;

a push arm provided on a predetermined portion of the lower surface of the chucking plate while being coupled to the second hinge shaft of the select arm, so that the push arm is rotated around the second hinge shaft of the select arm at a predetermined angle and is linearly and horizontally moved under the guide of the second hinge shaft, with a stop protrusion provided on a predetermined portion of the push arm and inserted into the protrusion guide hole of the select arm while being seated in one of the first and second guide hole parts of the protrusion guide hole, a pusher provided on an end of the push arm to push a predetermined portion of the chucking unit during the rotation of the push arm, thus operating the chucking unit, and with a spring coupled to a predetermined portion of the push arm to move the push arm in a direction opposite to a pushing direction thereof; and a push lever coupled to a third hinge shaft provided on a predetermined portion of the main body, with a contact pin extending downward from a predetermined portion of the push lever, so that, when a large-diameter optical disk is inserted into the optical disk player, the push lever is rotated around the third hinge shaft of the main body while the contact pin is in contact with the large-diameter optical disk, thus pushing the push arm inwardly, thereby allowing the stop protrusion of the push arm to be removed from the first or second guide hole parts of the select arm, a spring coupled to a predetermined portion of the push lever to return the push lever to an original position thereof when the contact pin is released, and a guide unit is provided around the inlet of the optical disk player, the guide unit comprising two guide pins respectively provided at left and right sides of the inlet of the main body to be symmetrical based on a central portion of the inlet, so that, when the optical disk is inserted into the inlet, the two guide pins are in contact with the optical disk, and are moved outwardly by a same predetermined distance from the central portion of the inlet, thus guiding the optical disk to the central portion of the inlet of the optical disk player.

8. The optical disk player according to claim 7, further comprising:

a slot provided on an intermediate portion of the chucking plate while extending from a front to a rear portion of the chucking plate;

a slider provided on a central portion of an upper surface of the guide arm and inserted in the slot of the chucking plate to slide along the slot, so that the guide arm is moved forward and rearward under the lower surface of the chucking plate;

a coupling protrusion provided on a predetermined portion of the upper surface of the guide arm to be spaced apart from the slider at a predetermined interval; and an elongate coupling hole provided on the first end of the select arm, so that the guide arm is coupled to the select arm by inserting the coupling protrusion of the guide arm into the elongate coupling hole of the select arm.

9. The optical disk player according to claim 7, further comprising:
   a hook provided on an end of the second hinge shaft of the select arm; and
   an elongate slide hole provided on a predetermined portion of the push arm to receive therein the second hinge shaft, so that the push arm is horizontally moved under the guide of the elongate slide hole of the push arm.

10. The optical disk player according to claim 7, wherein the guide unit comprises:
    a pinion gear rotatably provided at the central portion above the inlet of the optical disk player;
    a first guider provided at a predetermined position above the inlet of the optical disk player to be linearly moved in a latitudinal direction, with a first rack gear provided on a predetermined portion of the first guider to engage with the pinion gear, and a first guide pin provided on a predetermined portion of a front part of the first guider while extending downward to be exposed to the inlet of the optical disk player;
    a second guider provided at a predetermined position opposite to the first guider above the inlet of the optical disk player to be linearly moved in a latitudinal direction, with a second rack gear provided on a predetermined portion of the first guider to engage with the pinion gear, and a second guide pin provided on a predetermined portion of a front part of the second guider while extending downward to be exposed to the inlet of the optical disk player; and
    a spring coupled between the first and second guiders to elastically bias the first and second guide pins inwardly.

* * * * *